United States Patent [19]

Bechtel

[11] 4,042,901
[45] Aug. 16, 1977

[54] TEMPERATURE SENSING RESISTANCE PROBE AND METHOD OF MAKING A RESISTANCE ELEMENT THEREFOR

[75] Inventor: Jon H. Bechtel, Wayne, Pa.

[73] Assignee: Robertshaw Controls Company, Richmond, Va.

[21] Appl. No.: 649,612

[22] Filed: Jan. 16, 1976

[51] Int. Cl.² .................................................. H01C 3/04
[52] U.S. Cl. ........................................ 338/28; 29/612; 338/51; 338/229
[58] Field of Search ........................... 338/28, 22–25, 338/51, 229, 243; 73/362 AR, 339, 341, 342; 219/365, 530; 29/610, 612, 613

[56] References Cited
U.S. PATENT DOCUMENTS

| | | | |
|---|---|---|---|
| 2,036,071 | 3/1936 | Mucher | 338/24 |
| 2,444,410 | 6/1948 | Keinath | 73/362 AR |
| 2,493,311 | 1/1950 | Odell | 338/28 |

Primary Examiner—C. L. Albritton
Attorney, Agent, or Firm—Harold W. Adams

[57] ABSTRACT

The invention is a temperature sensing wire resistance probe including a temperature responsive resistance element assembled in a novel method and having insulation adequate for direct connection in the line voltage circuit of an oven temperature control.

6 Claims, 7 Drawing Figures

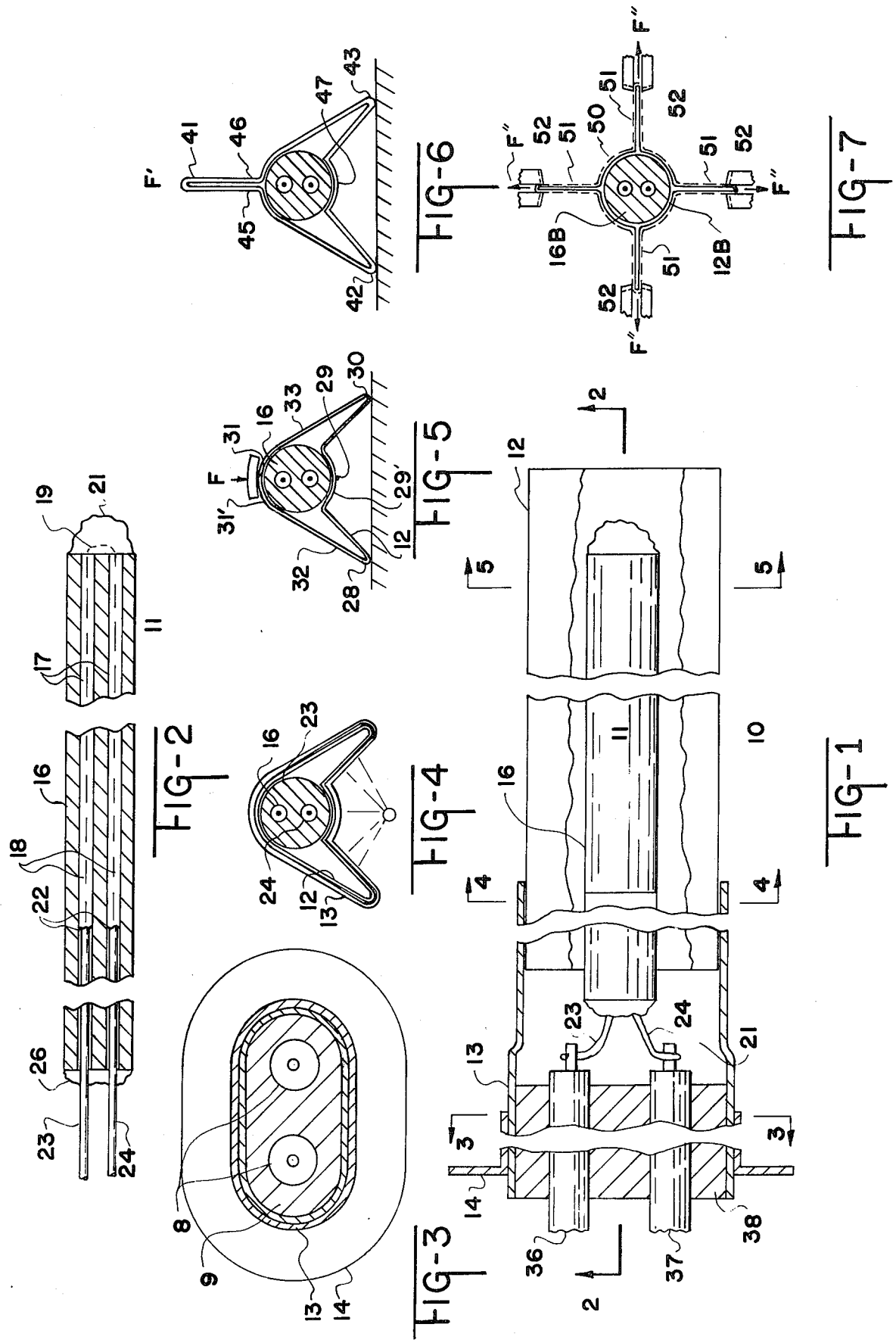

TEMPERATURE SENSING RESISTANCE PROBE AND METHOD OF MAKING A RESISTANCE ELEMENT THEREFOR

BACKGROUND OF INVENTION

Ovens in conventional domestic electric ranges are generally equipped with high wattage heating elements so that the oven warm-up time is short. Typically a rate of temperature rise of one degree per second is not uncommon. Under such warm-up conditions the rate of response of the oven temperature sensor to this sudden increase in temperature must be sufficiently rapid to prevent an excessive first cycle overshoot in the oven temperature.

Presently, when using a conventional resistance sensor having a heating time constant of 1.5 minutes in a typical domestic oven, an overshoot of 100° F or more during warm-up is not unusual. This overheating represents a waste of expensive electrical energy. While resistance sensors having an adequately fast response are presently available they do not have sufficient electrical insulation to be directly connected in a line voltage circuit. A low voltage transformer with an isolated secondary is required to use such probes. Even then isolation between the low voltage control circuit and the oven heater power circuit must also be provided.

Experience has shown the inclusion of an adequate thickness of high temperature electrical insulation material around a typical bobbin wound resistance element so that it may be used in the line voltage circuit creates too much thermal mass in the sensor for it to respond with adequate speed to increasing oven temperatures and thus avoid overshooting.

SUMMARY OF THE INVENTION

The foregoing disadvantages are overcome by a sensor in accordance with this invention which comprises a resistance sensor element mounted in a ceramic conduit which may be as small as ⅛ inch in outside diameter. A highly heat conductive metal sheaf having a unique, V-shaped cross-section receives and grippingly supports the ceramic conduit enhancing the performance of the sensor in several ways. First, the increased stiffness and strength of the V-shaped probe sheaf makes it less subject to damage from bending, the sheaf also protecting the ceramic conduit from mechanical shock forces and thus breakage.

Second, fins on the V-shaped sheaf provide a greater surface area for a relatively rapid heat transfer via both radiation and convection from the oven cavity heating element to the sheaf and resistance sensor element in the ceramic conduit. Radiant energy transfer between the oven heating element and the sheaf is improved when the sheaf is blackened in color as by a chemical oxidation process.

Further, the novel wing or fin configuration of the V-shaped sheaf improves the thermal transfer over that between the same oven heating element and a resistance sensor encased in a cylindrical case or sheaf. This is because the fins of the V-shaped sheaf not only provide a greater surface area of exposure to radiant heat from the element but also serves to reflect and collect radiant heat when properly positioned relative to the heating element.

Since the heating elements are very hot during the initial warm-up when overshoot is a serious problem, the improved response of the blackened V-shaped sheaf to the increased thermal radiation of the oven heating elements increases the rate of thermal response of the sensor to the rapid increase in oven temperature during warm-up. This reduces the undesirable and wasteful temperature overshoot permitted when using conventional resistance sensors. After the oven reaches the selected temperature, the heating elements are energized only a small percentage of the time to maintain a constant oven temperature. They are therefore much cooler than during warm-up. Thus, the radiant heating of the probe by the oven heating element is much lower than during the initial warm-up and the temperature of the sensing probe remains close to the temperature of the air in the oven cavity.

The more rapid convective and conductive heating of the probe due to its greater surface area also substantially speeds the response of the probe during warm-up with improved accuracy in sensing the actual oven temperature during steady state operation.

Another important advantage of the use of a V-shaped sheaf in accordance with the invention is its increased strength even though it is formed of a thin wall tubing. The use of a thin wall tube reduces the temperature gradiant and the thermal mass of the sheaf which in turn enhances the rate of heat transfer to the resistance temperature sensor element.

In addition to protecting the resistance sensing element from mechanical shock and breakage, the V-shaped configuration of the sheaf permits the sheaf to be flexed and expanded permitting easy insertion of the resistance sensing element therein. When the flexure force is removed, the sheaf attempts to spring back to its original position to firmly grip and clamp the resistance sensor in position within the sheaf. This clamping action increases the rate of heat transfer between the sheaf and the resistance sensor by minimizing the air space between the engaging surfaces of the sheaf and sensor.

Another advantage offered by the V-shaped sheaf structure over that of the conventional cylindrical sheaf or casing is that the cost and problems of close tolerances to achieve a close, engaging fit between the sheaf and sensor to minimize the spacing between the two elements are avoided.

BRIEF DESCRIPTION OF THE DRAWINGS

FIG. 1 is a cross-sectional view of a preferred embodiment of a resistance temperature sensing probe assembly in accordance with the principals of the invention;

FIG. 2 is a cross-sectional view along lines 2 — 2 in FIG. 1 showing the temperature sensing element in the probe assembly illustrated in FIG. 1;

FIG. 3 is a cross-sectional view taken along the lines 3 — 3 in FIG. 1 showing the installation of and attachment of external leads to the probe;

FIG. 4 is a cross-sectional view taken along lines 4 — 4 in FIG. 1 showing insertion of the probe sheaf into a probe head housing;

FIG. 5 is a cross-sectional view taken along lines 5 — 5 in FIG. 5 illustrating the manner in which the sheaf is flexed and thus enlarged to receive the active temperature sensing element of the probe assembly;

FIG. 6 is a cross-sectional view illustrating an alternative embodiment of a probe sheaf in accordance with the invention shown in FIG. 5 in greater detail; and FIG. 7 is a cross-sectional view illustrating another alternative embodiment of the invention.

BRIEF DESCRIPTION OF THE INVENTION

Referring to FIGS. 1 – 5 of the drawing, a preferred embodiment of a temperature sensing resistance probe in accordance with the invention is designated generally by reference numeral 10 and illustrated as generally comprising a temperature sensing element resistance designated by reference arrow 11 mounted in a V-shaped metallic sheaf 12 that is received within a probe head housing 13 V-shaped at one end and oval at the other, where it is spot welded to a mounting flange 14.

As shown in FIG. 2 the temperature sensing resistance element 11 comprises a cylindrical ceramic conduit or casing 16 having two spaced parallel passages 17 which receive opposite end portions 18 of a single strand of temperature sensitive wire 19. The wire 19 is extended in the shape of a U, the legs of the U being received within the passages 17. As is well known the wire 19 may be formed of platinum, nickel or other suitable material having the required temperature-resistance characteristics and other physical properties for the temperature range in which the sensing element 11 is to be employed.

Passages 17 and the exposed portion of the resistance wire 19 are sealed by a drop of ceramic cement 21 and the free ends of the resistance wire 19 within the passages 17 spot welded at 22 to leads 23 and 24 formed of nichrome or other suitable heat resisting material. Leads 23 and 24 are secured and sealed in the mouths of passages 17 by a drop of ceramic cement 26.

As shown in FIG. 4 the ceramic casing 16 is clamped or gripped by and supported within an integrally formed V-shaped sheaf 12. The sheaf 12 is formed of a flexible, heat conductive material such as thin wall metal tube selected for its heat conductive characteristics as well as its strength and ability to resist high temperature environments of up to 1000° F or more depending upon the sensor's application.

The inner V of sheaf 12 is designated by the reference points 28, 29 and 30 is shallower and of greater angle than the outer V of the sheaf 12 designated by reference points 28, 31 and 30. Legs 32 and 33 of the V-shaped sheaf 12 serve as thermal collectors and heat conductive fins and are integrally interconnected at points 29 and 31 by diametrically opposing semicircular wall portions 29' and 31' equally curved to correspond to the curvature of the ceramic casing. The opposing curved wall portions 29' and 31' form a partially circular passage through the sheaf 12 and for receiving the cylindrical ceramic casing 16.

To assemble the temperature sensing resistance probe leads 23 and 24 are first extended entirely through the casing 16 from one end and spot welded at 22 to both ends 17 and 18 of resistance wire 19. Leads 23 and 24 are then withdrawn pulling both ends 18 of the resistance wire 19 into the casing as shown in FIG. 2. Leads 23 and 24 are then trimmed to the required length and secured and sealed to the casing by a drop of cement at 26. The opposite end of casing 16 is similarily sealed at 21. This sealing of the ceramic core reduces oxidation of the resistance wire 19 thus improving its resistance-temperature characterics. Leads 23 and 24 are spot welded to conductors 36 and 37 which are brought out of the probe assembly through an electrical insulator 38. Additional cement is placed in space 21 to secure and insulate the lead connection.

As shown in FIG. 5 flexible, V-shaped sheaf 12 is initially formed so that the inside diameter of curved portions 29' and 31' is smaller than that of the ceramic casing 16. To assemble the oversize ceramic casing 16 inside the sheaf 12 a force F is applied as shown in FIG. 5.

This force F spreads the legs or fins 32 and 33 at a wider angle. Since the inner V designated by points 28, 29 and 30 is shallower, being formed at a wider angle than the outer V designated by points 28, 31 and 30, point 29 is moved downward a greater distance than point 31. This action increases the inside diameter of the partial circle formed by the opposing side wall portions 29' and 31' so that the ceramic casing 16 of the lead-resistance sensor subassembly can be easily inserted into the expanded sheaf 12.

When the ceramic casing 16 is properly positioned in the sheaf 16 the force F is removed. The expanded curved side wall 29' and 31' of the flexed sheaf 12 then tend to return to their initial position to engage and firmly grip the ceramic casing 16 on opposite sides along its entire length. To facilitate initial insertion of the casing 16 into the sheaf 12, the inside diameter of the sheaf for a portion of its length at the end received in housing 13 may be larger than casing 16. This slight enlargement avoids a later possible interference fit between the lead-sensor subassembly and sheaf that could result from distortion caused by spot welding the housing 13 to the sheaf 12. Mounting flange 14 is then attached permitting the temperature sensing resistance probe 10 to be properly positioned relative to heating element 35 (FIG. 4) in the oven or other cavity the temperature of which is to be sensed by the change of resistance of the temperature sensitive wire 19.

The fin shaped configuration of the highly heat conductive, thin walled metal sheaf 12 in accordance with the invention offers several advantages in fabrication, assembly, and in thermal sensitivity. Because of its electrical insulation, the probe 10 may be directly connected into the line voltage circuit of an electrical oven. By inserting a single piece of temperature sensitive resistance wire 19 in spaced, parallel passages in ceramic casing 16, the cost of the wire per sensor is greatly reduced compared to the typical bobbin wound resistance sensor element.

The diameter of the ceramic casing 16, an excellent electrical insulator, is smaller thus offering a shorter temperature gradient between the sheaf 12 and the wire 19 increasing the thermal sensitivity of the probe 10.

Further the flexible sheaf 12 permits the sensor assemble 11 to be easily inserted into the sheaf 12 while at the same time assuming a positive, close fitting and gripping relationship between the sheaf 12 and casing 16 when the flexure force F is removed.

This gripping action minimizes the air space between the engaging semicircular surfaces 29' and 31' of the sheaf 12 and casing 16 and improves thermal sensitivity. It also avoids the need for close tolerances required in the manufacture and assembly of probes in which a cylindrical ceramic core is inserted in a cylindrical sheaf as in typical wire wound bobbin type resistance sensors.

The V-shape of the sheaf serves to strengthen the thin walled sheaf 12 providing increased protection of the ceramic casing 16 from mechanical shock and twisting while at the same time providing a greater surface area for exposure to the heat of convection within the oven and the radiant heat from the heating element 31.

As shown in FIG. 4, the centers of passages 17 and of the curved portions 29' and 31' of sheaf 12 lie on a straight line so that end portions 17 and 18 of the resistance wire pass the same and closest possible distance to the curved sheaf portions 29' and 31' for any given diameter of ceramic casing 16. While this arrangement is preferred because of what is believed to be the most efficient heat transfer position between the sheaf 12 and resistance wire 19, the positioning of the casing 16 within the sheaf 21 and thus of the resistance wire 19 relative to the sheaf 12 may be varied from that shown in FIG. 4.

In some applications, it may be desirable to provide more than two fins 32 and 33 on the probe sheaf 12. For instance, there may be a need for more heat exchange surface as well as a more symmetrical shape to enhance appearance, to facilitate mounting of the probe or to make response characteristics due to convection or radiation less subject to probe orientation.

A sheaf having three non-symmetrical fins 41, 42 and 43 in accordance with an alternative embodiment of the invention is shown in FIG. 6. Application of a force F' tends to push points 45 and 46 at the base of the top fin 41 together. The fin 41 is made with points 45 and 46 close together or touching. The result is that application of the force F' will cause an increase in the distance between points 42 and 43 and a resulting increase in the distance between points 45 and 47 and between points 46 and 47. The resulting clamping action of the sheaf 16A when force F' is removed is similar to that of the two finned sheafs described previously.

FIG. 7 illustrates another alternative embodiment of the invention. Such a sheaf 50 with a completely symmetrical cross-section as shown here may require a more elaborate fixture to enlarge its inside diameter. Each of the fins 51 are held at their outer edges by clamps 52 and the sheaf diameter 53 is enlarged by application of the forces F''', the dashed lines indicating the flexed shape assumed by the sheaf. The casing 16B of the sensing probe may be freely inserted into the sheaf 50. The forces F''' and clamps 52 may then be removed to permit a uniform clamping of the sensing element casing 16B in the sheaf 50.

Although preferred embodiments of this invention have been described in detail, numerous changes and modifications can be made within the principles of the invention which is also to be limited only by the scope of the appended claims.

What is claimed is:

1. A temperature sensing resistance probe comprising:
   an insulating casing;
   a temperature sensitive resistance element positioned within said insulating casing;
   an elongated heat conductive sheaf having a continuous sidewall around the longitudinal axis thereof, said sheaf being substantially uniformly expandible along the length upon the application of an external force thereto to receive said insulating casing; and thereafter grippingly engaging said insulating casing upon the removal of said external force; and
   means for connecting said temperature sensitive resistance element into an electrical circuit.

2. A temperature sensing resistance probe defined in claim 1 wherein said insulating casing is circular in cross-section and said heat conductive sheaf is intearally formed of a thin walled metal tube into a substantially V-shaped cross-sectional configuration formed by two interconnected leg portions and having a partially circular passage therethrough, the diameter of said partially circular passage normally being less than that of said insulating casing and expandible to receive said insulating casing upon the application of an external force to said V-shaped sheaf, said V-shaped sheaf thereafter grippingly engaging said insulating casing along its length upon the removal of said external force.

3. A temperature sensing probe is defined in claim 2 wherein the legs of the V-shaped sheaf serve as thermal collector and heat conductive fins, said fins being integrally interconnected by diametrically opposed semicircular side wall portions of said sheaf, the diameter of said partially circular passage formed thereby expanding upon the application of said external force and retracting upon the removal thereof.

4. A temperature sensing resistance probe as defined in claim 2 wherein said insulating casing is cylindrical and formed of ceramic, said cylindrical casing have spaced, longitudinal passages therein for receiving said temperature sensitive resistance element.

5. A temperature sensing resistance probe as defined in claim 2 wherein said casing is provided with spaced parallel passages extending longitudinal therethrough for receiving said temperature resistance element comprising a single strand of temperature sensitive resistance wire the ends of which are received within said spaced parallel passages, said passages being sealed with said temperature sensitive resistance wire therein.

6. The temperature sensing resistance probe as defined in claim 5 wherein said means for connecting said temperature sensitive resistance element into an electric circuit comprises:
   a pair of leads connected to the ends of said temperature sensitive resistance wire within said passage;
   insulated conductor means attached to said leads for connection into an electric circuit;
   a housing means for receiving an end of said sheaf and said insulated conductors; and
   mounting means affixed to said housing means.

* * * * *